United States Patent [19]

Goodall et al.

[11] 4,295,670
[45] Oct. 20, 1981

[54] QUICK-DISCONNECT CAM LOCKING SAFETY COUPLING

[75] Inventors: Richard B. Goodall, Worton; Richard L. Goodall, Chestertown, both of Md.

[73] Assignee: Dixon Valve & Coupling Co., Chestertown, Md.

[21] Appl. No.: 158,501

[22] Filed: Jun. 11, 1980

[51] Int. Cl.³ .............................................. F16L 37/18
[52] U.S. Cl. ..................................... 285/91; 285/312; 285/313
[58] Field of Search ........................ 285/312, 313, 91; 85/8.3; 292/283

[56] References Cited

U.S. PATENT DOCUMENTS

| | | | |
|---|---|---|---|
| 154,536 | 8/1874 | Wolf | 85/8.3 |
| 205,075 | 6/1878 | Griffin | 292/283 X |
| 928,370 | 7/1909 | Feickert | 285/313 X |
| 1,128,474 | 2/1915 | Martz | 285/91 |
| 1,481,392 | 1/1924 | Schawrow | |
| 1,530,651 | 3/1925 | Corbett | 285/312 |
| 1,782,062 | 11/1930 | Erickson | 285/313 X |
| 1,903,445 | 4/1933 | Ernst | 285/313 X |
| 2,033,142 | 3/1936 | Lewis | |
| 2,399,119 | 4/1946 | Howell | 85/8.3 |
| 2,499,048 | 2/1950 | Yager | |
| 2,518,026 | 8/1950 | Krapp | |
| 2,643,139 | 6/1953 | Hamilton | |
| 2,757,944 | 8/1956 | Krapp | |
| 3,124,374 | 3/1964 | Krapp | 285/85 |
| 3,432,191 | 3/1969 | Ludeman | |
| 3,439,942 | 4/1969 | Moore et al. | 285/312 X |
| 3,976,313 | 8/1976 | Lauffenburger et al. | 285/84 |
| 4,222,593 | 9/1980 | Lauffenburger | 285/312 X |

FOREIGN PATENT DOCUMENTS 52-70271 6/1977 Japan ...................................... 85/8.3

Primary Examiner—Thomas F. Callaghan
Attorney, Agent, or Firm—Harding, Earley & Follmer

[57] ABSTRACT

A quick-disconnect cam locking safety coupling has a hollow male plug having an external peripheral groove. The plug is received in a socket. The socket has a pair of opposed openings opposite the peripheral groove. A gasket seals between the male plug and the socket. A pair of cam members each has a lever lying adjacent the socket and a cam portion passing through one of said side openings and engaging the peripheral groove. Each cam member is pivotally connected to the socket for outward movement of the levers away from the socket to disengage the cam portions from the peripheral groove. Each cam member is locked in the groove engaging position by a removable wire pin engaged by at least one lug on the socket and adapted to limit the outward movement of the cam member lever.

3 Claims, 8 Drawing Figures

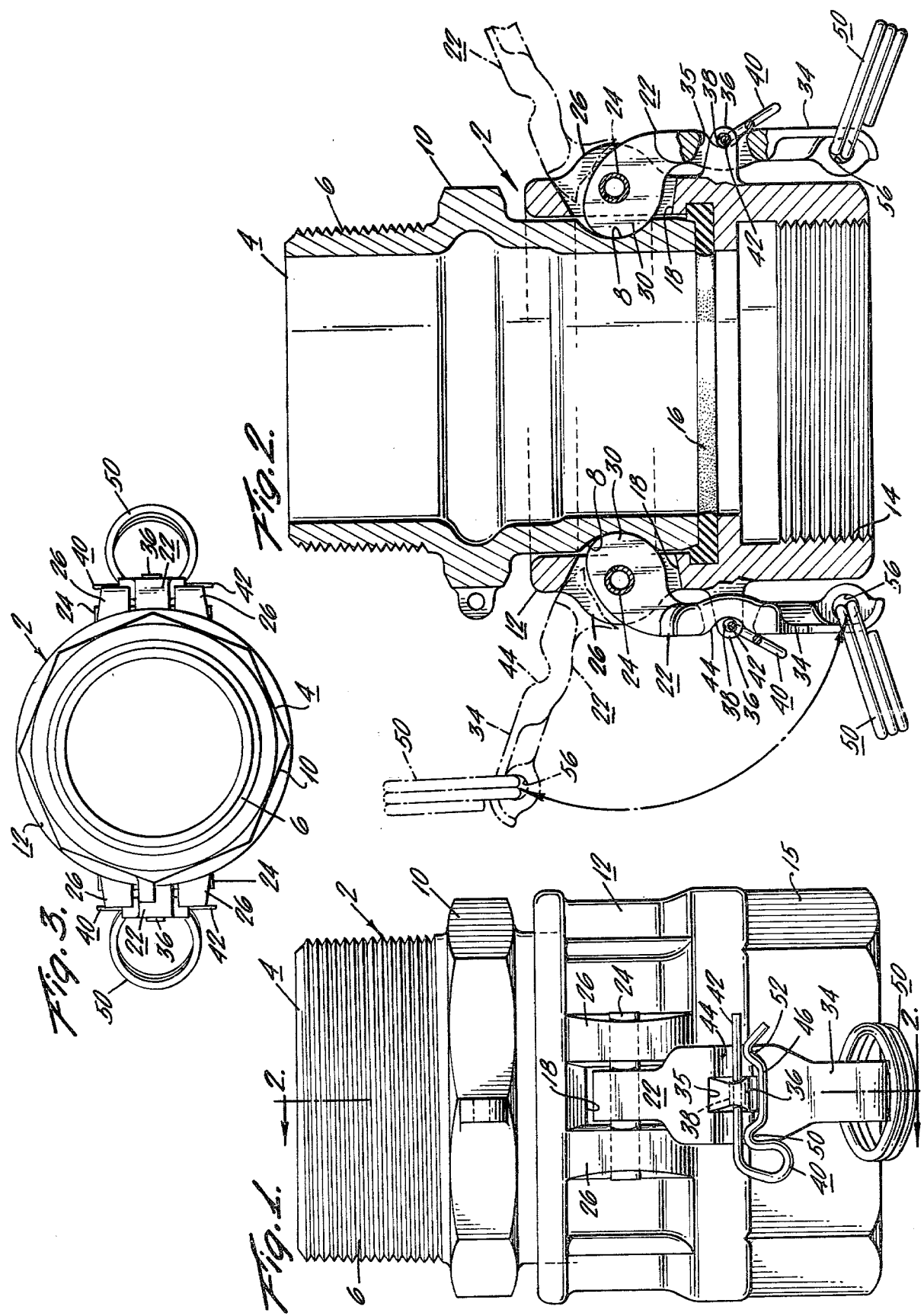

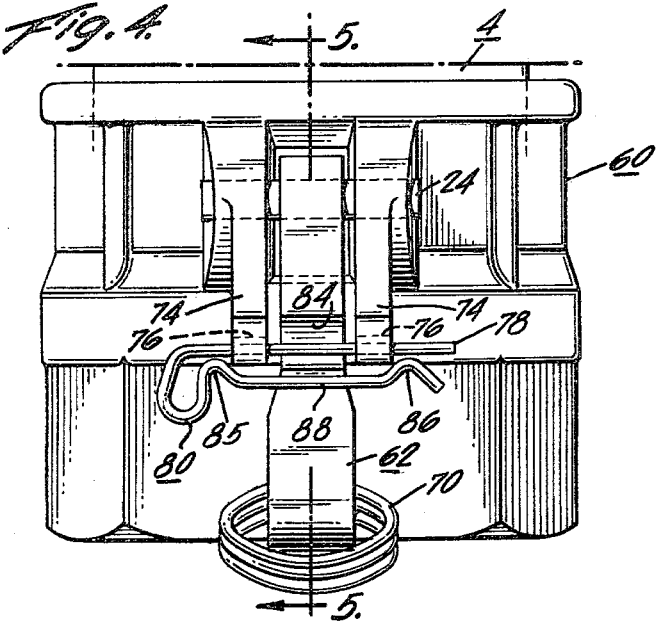
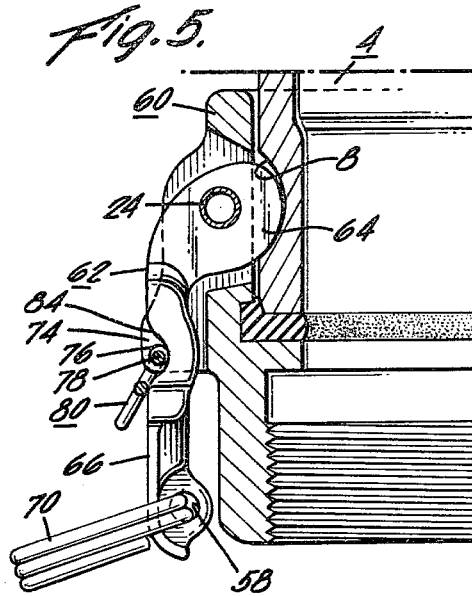
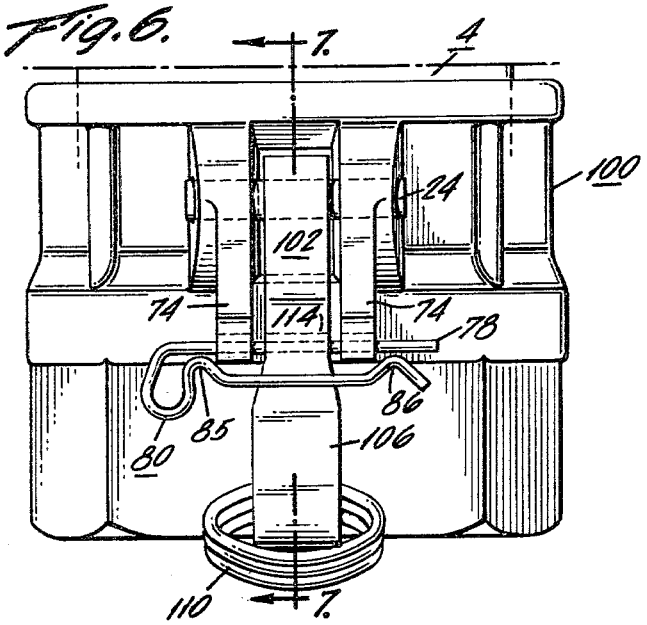
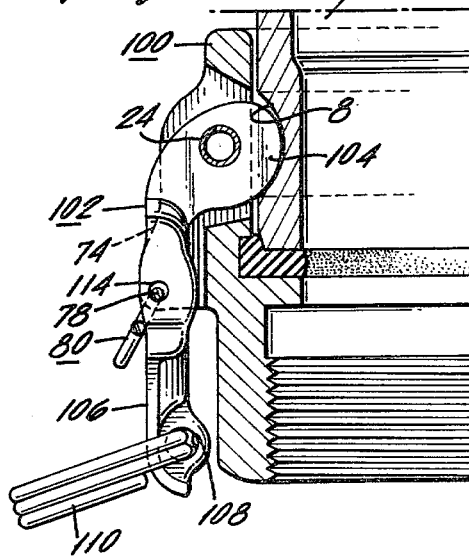
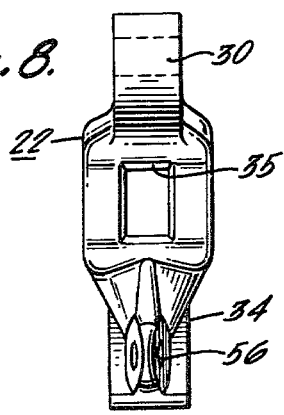

QUICK-DISCONNECT CAM LOCKING SAFETY COUPLING

TECHNICAL FIELD

This invention is in the field of couplings for hose and pipe.

BACKGROUND OF THE PRIOR ART

It is well known to have male and female coupling members removably locked together by a peripheral groove in one member and a pair of pivoted cam members on the other member adapted to engage the peripheral groove. The desirability of holding the cam members in the locking position is recognized by the prior art. Reference may be had for example to U.S. Pat. No. 3,976,313 in which detents are employed to hold levers on such cam members in closed position against inadvertent rotation. In U.S. Pat. No. 3,124,374 a similar structure is disclosed in which rotation of a lever on a cam member is prevented by a pin having an axis parallel to the axis of the coupling and mounted in a spring biased plunger with an axis perpendicular to the axis of the pin in such a manner that depressing the plunger clears the pin away from the cam member lever to permit its rotation. The use of a detent as in U.S. Pat. No. 3,976,313 is risky since a relatively small force can pop the cam member free of the detent and thus permit the unlocking of the coupling. The structure of U.S. Pat. No. 3,124,374 is relatively expensive and is subject to malfunctioning incident to being invaded by dirt. These disadvantages have been overcome by providing a locking device in which all the parts are integral with the coupling except for a removable wire pin which holds the cam lever securely since the only way the cam lever can come loose is to shear the pin. The device of the invention is simple, inexpensive and effective. The only loose part is the pin which is very cheap and can be replaced at little cost if lost.

BRIEF SUMMARY OF THE INVENTION

A quick-disconnect cam locking safety coupling has a hollow male plug having an external peripheral groove. The plug is received in a socket. The socket has a pair of opposed side openings opposite the peripheral groove. A gasket seals between the male plug and the socket. A pair of cam members each has a layer lying adjacent the socket and a cam portion passing through one of said side openings and engaging the peripheral groove. Each cam member is pivotally connected to the socket for outward movement of the levers away from the socket to disengage the cam portions from the peripheral groove. Each cam member is locked in the groove engaging position by a removable wire pin engaged by at least one lug on the socket and adapted to limit the outward movement of the cam member lever. Advantageously, the cam member lever has an opening receiving a lug integral with the socket, and a pin engages an opening in the lug and the exterior of the lever. Alternatively, a pin engages the exterior of the cam member lever and engages an opening in a pair of lugs on each side of the lever. If desired, the pin engaging such a pair of lugs may pass through an opening in the cam member lever. When the pin engages the exterior of the lever, it is preferred to provide a recess in the lever to receive the pin to reduce to a minimum the distance the locking device protrudes from the body of the coupling.

BRIEF DESCRIPTION OF THE DRAWINGS

FIG. 1 is a side elevation of a coupling in accordance with the invention;

FIG. 2 is a vertical section taken on the plane indicated by the line 2—2 in FIG. 1;

FIG. 3 is a top-plan view of the coupling of FIG. 1;

FIG. 4 is a side elevation of an alternative coupling in accordance with the invention, partially broken away;

FIG. 5 is a vertical section taken on the plane indicated by the line 5—5 in FIG. 4, partially broken away;

FIG. 6 is a side elevation of an alternative coupling in accordance with the invention, partially broken away;

FIG. 7 is a vertical section taken on a plane indicated by the line 7—7 in FIG. 6, partially broken away;

FIG. 8 is an elevational view of one of the cam members of the coupling of FIG. 1.

DETAILED DESCRIPTION

As seen in FIG. 1, a preferred coupling 2 in accordance with the invention has a hollow male plug 4 having external threads 6 at one end and a peripheral locking groove 8 (FIG. 2) adjacent the other end. Male plug 4 has an octagonal portion 10 adapted to be engaged by a wrench. Male plug 4 is telescoped into one end of a socket 12 which is internally threaded at its other end as indicated at 14 (FIG. 2). Socket 12 has an octagonal portion 15. A gasket 16 seals between plug 4 and socket 12. Socket 12 has opposed side openings 18 (FIG. 2) opposite the peripheral groove 8 in plug 4. Associated with each opening 18 is a cam member 22 which is pivotally mounted on a hollow pin 24 fixedly secured to a pair of ears 26 (FIG. 1) integral with socket 12. Each cam member 22 has a cam portion 30 in engagement with locking groove 8 and has an integral locking lever 34.

Each lever 34 has an opening 35 (FIG. 2) receiving a lug 36 integral with socket 12. Each lug 36 has an opening 38 which receives a straight portion 42 of a wire locking pin 40. Lever 34 has a recessed portion 44 receiving the portion 42 of pin 40 to minimize the distance the lug 36 must protrude from the body of socket 12. Pin 40 is clipped to lug 36 by an arm 46 running generally parallel to portion 42 and having inwardly bent portions 50 and 52 which are adapted to engage lug 36 to keep the wire pin centered and prevent its inadvertent removal from lug 36. Each lever 34 has an opening 56 receiving a multi-turn wire ring 50 for manipulating lever 34.

OPERATION

To assemble the coupling, male plug 4 is telescoped into socket 12 against gasket 16 with cam members 22 in the elevated position shown in phantom in FIG. 2. When the plug 4 is seated on gasket 16, cam member levers 34 are rotated on pins 24 to carry each cam portion 30 into engagement with locking groove 8 to lock plug 4 and socket 12 together. On reaching the locking position, each opening 35 receives its associated lug 36. The portion 42 of pin 40 is then inserted into opening 38 of lug 36 to lock the lever 34 in position.

Alternative Embodiments

An alternative coupling socket 60 which can be substituted for socket 12 is shown in FIG. 4. Socket 60 is essentially the same as socket 12 with the exception that it has a modified cam member 62 mounted on pin 24. Cam member 62 has a cam portion 64 in engagement with peripheral groove 8 of male plug 4 and an integral lever 66 having an opening 58 for the reception of a multi-turn wire ring 70. As best seen in FIG. 4, a pair of lugs 74, 74 integral with socket 60 lie on each side of lever 66 and each has an opening 76 in which is mounted the straight portion 78 of a wire-locking pin 80. Portion 78 of pin 80 is received in a recessed portion 84 of lever 66. Pin 80 has bent portions 85 and 86 on arm 88 which are adapted to engage lugs 74, 74 to center pin 80 and prevent its inadvertent removal. The operation of this embodiment will be obvious from the description of the operation of coupling 2.

A further alternative socket 100 in accordance with the invention is shown in FIGS. 6 and 7. Socket 100 is the same as socket 60 with the exception that it employs a modified cam member 102 having a cam portion 104 in engagement with locking groove 8 of a plug 4 and pivotally mounted on a pin 24. Cam member 102 has an integral lever 106 with an opening 108 for the reception of a multi-turn wire ring 110. Lever 106 lies between lugs 74, 74 and has a bore 114 for the reception of the straight portion 78 of a wire-locking pin 80. The operation of this embodiment will be obvious from the description of the operation of coupling 2.

It will be understood that the above-described embodiments are illustrative and not limiting.

We claim:

1. A quick-disconnect cam locking safety coupling comprising:
    a hollow male plug having an external peripheral groove,
    a socket receiving said male plug and having a pair of opposed side openings opposite said peripheral groove,
    a gasket for sealing between the male plug and the socket,
    a pair of cam members each having a lever with an opening and lying adjacent the socket and a cam portion passing through one of said side openings and engaging said peripheral groove and each being pivotally connected to the socket for outward movement of the levers away from the socket to disengage the cam portions from the said peripheral groove,
    a lug on the socket adjacent each cam member lever and extending through the opening in the lever,
    the exterior of each of said levers having a recessed portion adjacent the opening in the lever to minimize the distance the lug must protrude from the body of the socket,
    each lug having an opening therethrough lying substantially in a plane perpendicular to the axis of the coupling, and
    a wire pin clipped to the lug with a straight arm of the pin passing through each lug opening and accommodated in the recessed portion of the adjacent lever to hold the adjacent cam member in the groove engaging position, and a bent arm of the pin outside the lug and having a bent portion on each side of the lug to center and lock the pin onto the lug.

2. A quick-disconnect cam locking safety coupling comprising:
    a hollow male plug having an external peripheral groove,
    a socket receiving said male plug and having a pair of opposed side openings opposite said peripheral groove,
    a gasket for sealing between the male plug and the socket,
    a pair of cam members each having a lever lying adjacent the socket and a cam portion passing through one of said side openings and engaging said peripheral groove and each being pivotally connected to the socket for outward movement of the levers away from the socket to disengage the cam portions from the said peripheral groove, and
    locking means for locking each cam member in the groove engaging position including a pair of lugs with one of said lugs positioned on the socket on each side of each cam member lever, each lug having an opening, a removable wire pin passing through said lug openings and engaging the exterior of the cam member lever to limit the outward movement of said lever, said cam member lever having a recess to accommodate the removable wire to minimize the distance the lugs must protrude from the body of the socket,
    said wire pin clipped to the lugs with a straight arm of the pin passing through each lug opening and seated in the recessed portion of the lever to lock the cam member in groove engaging position, and a bent arm of the pin positioned outside the lugs, said bent arm having a pair of bent portions with one of said bent portions being positioned on each side of the pair of lugs to center and lock the pin onto the lugs.

3. A quick-disconnect cam locking safety coupling comprising:
    a hollow male plug having an external peripheral groove,
    a socket receiving said male plug and having a pair of opposed side opposite said peripheral groove,
    a gasket for sealing between the male plug and the socket,
    a pair of cam members each having a lever with an opening lying adjacent the socket and a cam portion passing through one of said side openings and engaging said peripheral groove and each being pivotally connected to the socket for outward movement of the levers away from the socket to disengage the cam portions from the said peripheral groove, and
    locking means for locking each cam member in the groove engaging position including a pair of lugs on the socket with one lug on each side of each cam member lever, each lug having an opening, a removable wire pin passing through said lug openings in each pair of lugs and through the opening in the adjacent cam member lever to limit the outward movement of said lever,
    said wire pin being clipped to the lugs with a straight arm of the pin passing through each lug opening, and a bent arm of the pin positioned outside the lugs,
    said bent arm having a pair of bent portions with one of said bent portions being positioned on each side of the pair of lugs to center and lock the pin onto the lugs.

* * * * *